US007568128B2

(12) United States Patent
Rhoades

(10) Patent No.: US 7,568,128 B2
(45) Date of Patent: Jul. 28, 2009

(54) SELECTIVE ALTERATION OF SHELL UTILITY RETURN CODE

(75) Inventor: Joshua Marshall Rhoades, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 11/401,816

(22) Filed: Apr. 11, 2006

(65) Prior Publication Data

US 2007/0260930 A1 Nov. 8, 2007

(51) Int. Cl.
G06F 11/00 (2006.01)
(52) U.S. Cl. .......................................... 714/38; 714/57
(58) Field of Classification Search .................. None
See application file for complete search history.

(56) References Cited

U.S. PATENT DOCUMENTS

| | | | | |
|---|---|---|---|---|
| 5,561,767 | A * | 10/1996 | Eisenberg et al. | 714/47 |
| 6,115,544 | A * | 9/2000 | Mueller | 714/57 |
| 6,126,328 | A | 10/2000 | Mallory et al. | 395/704 |
| 6,363,503 | B1 * | 3/2002 | Clauss et al. | 714/57 |
| 6,601,183 | B1 * | 7/2003 | Larson et al. | 714/4 |
| 6,988,262 | B1 | 1/2006 | Mallory et al. | 717/127 |
| 7,124,328 | B2 * | 10/2006 | Bowers et al. | 714/39 |
| 7,168,012 | B2 * | 1/2007 | Clauss et al. | 714/57 |
| 7,203,930 | B1 * | 4/2007 | Kirkpatrick et al. | 717/125 |
| 2002/0083377 | A1 * | 6/2002 | Clauss et al. | 714/57 |
| 2004/0010494 | A1 | 1/2004 | Blaicher | 707/7 |
| 2005/0182843 | A1 * | 8/2005 | Reistad et al. | 709/230 |
| 2007/0204012 | A1 * | 8/2007 | Kruse et al. | 709/219 |

OTHER PUBLICATIONS

Rollins, D. Inspec—An-2505055, Programmer's Journal, vol. 3, No. 2, pp. 22-25, 1985, A03 (Abstract).
"Modernizing Existing Software: A Case Study", Everaars, et al., IEEE/ACM, 0-7695-2153-3/04.
"A Distributed, Operating System Based, Blackboard Architecture for Real-Time Control", D. L. Larner, IEEE/ACM 089791-372-8/90/00007/0099, pp. 99-108.

* cited by examiner

Primary Examiner—Christopher S McCarthy
(74) Attorney, Agent, or Firm—John H. Holcombe

(57) ABSTRACT

In a shell utility computer program code configured to cause at least one computer processor comprising one host computer system to connect to a second host computer system, and to cause the second host computer system to execute at least one command provided to one host computer system, the computer program code is configured to cause the one host computer system to selectively alter a pre-existing return code for use on shell utility error; and to cause the one host computer system to, in the absence of an alteration to the pre-existing return code, select a pre-existing return code of the shell utility as a default.

16 Claims, 2 Drawing Sheets

SELECTIVE ALTERATION OF SHELL UTILITY RETURN CODE

FIELD OF THE INVENTION

This invention relates to computer program utilities, and, more particularly, to utilities that execute a command on another host computer system.

BACKGROUND OF THE INVENTION

There are several examples of computer program utilities that execute commands on another host computer system, such as "rexec" (remote execution), "rsh" (remote shell), or "ssh" (secure shell). Herein, such computer program utilities are termed "shell utilities". Typically, a command is provided to the shell utility at one host computer system by a user together with the name of another host computer system to be executed on another host computer system. The ability to retrieve the exit status of the command as a return code is desirable. As with any command, if the command is properly executed and completed, a return code may be provided, typically a "0", to indicate successful completion. In the case of a command completing with an error, the return code will typically be non-zero, and depends on the command, and may indicate the type of error.

A shell utility that executes a command on another host computer system may provide the exit status of the command as the exit status of the shell utility. If the utility encounters an error preventing the command from being executed and the exit status retrieved, it may exit with an exit status value indicating the error. Herein, a return code indicating an error relating to the shell utility itself is termed "return code for shell utility error", or similar language. To attempt to separate an error with the utility from an error with the command, the return code for shell utility error may be a set value that is different from as many of the command codes as is known by the programmer(s) that created the utility. However, ambiguity occurs if the set value is among the possible exit status values of the remote command.

SUMMARY OF THE INVENTION

Computer implemented methods and computer program products are provided for a shell utility computer program code configured to cause at least one computer processor comprising one host computer system to connect to a second host computer system, and to cause the second host computer system to execute at least one command provided to one host computer system.

In one embodiment, a shell utility is modified to selectively alter at least one pre-existing return code for use on shell utility error to a return code provided as a parameter of the shell utility; and further modified to, in the absence of the provided return code for use on shell utility error, to select the pre-existing return code as a default.

Thus, in a further embodiment, the modification may comprise computer program code that is configured to cause the one host computer system to selectively alter at least one return code for use on shell utility error; and to cause the one host computer system to, in the absence of an alteration to the at least one return code, select a pre-existing return code for use on shell utility error as a default.

In another embodiment, the computer program code for causing the one host computer system to selectively alter the return code for use on shell utility error, comprises causing the one host computer system to selectively alter the at least one return code to a return code provided to the one host computer system as a parameter of the shell utility.

In a further embodiment, the parameter is provided with the command to be executed.

In another embodiment, the computer program code configured to cause the one host computer system to selectively alter the at least one return code for use on shell utility error comprises causing the one host computer system to directly substitute the provided return code for the pre-existing return code.

In still another embodiment, the computer program code configured to cause the one host computer system to selectively alter the at least one return code for use on shell utility error comprises causing the one host computer system to access a table and derive the provided return code from the table.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
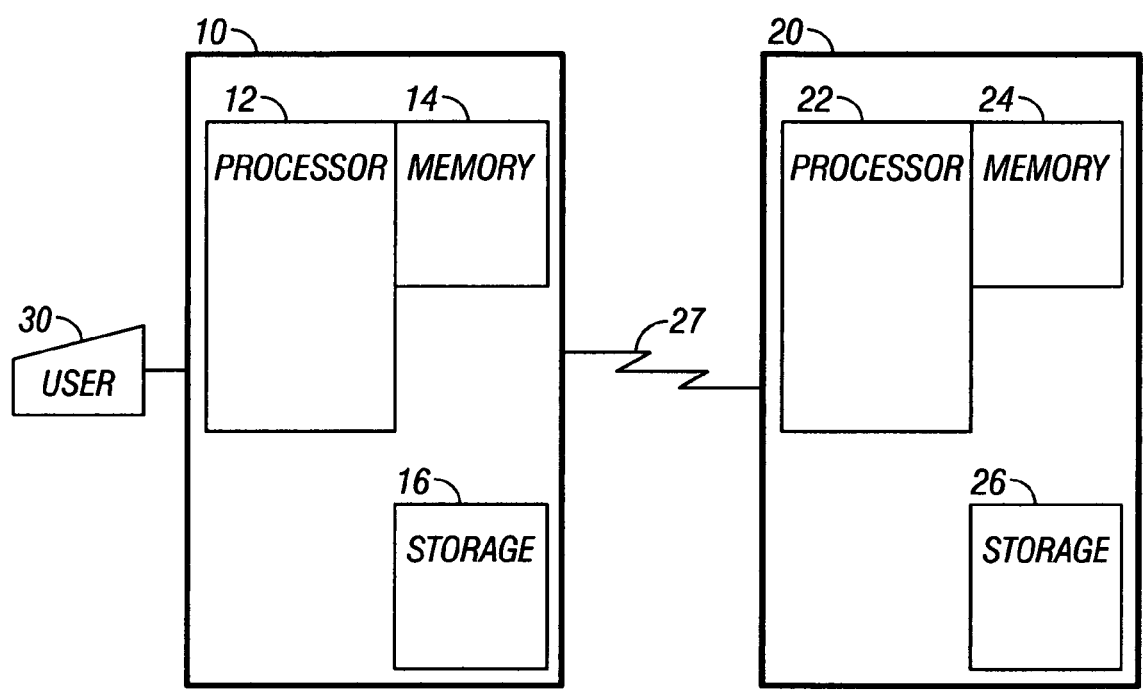
FIG. 1 is a block diagram of host computer systems and a shell utility in accordance with the present invention.

Referring to FIG. 1, one host computer system 10 comprises at least one processor 12 and an associated memory 14. Programs to be executed and data may be stored in storage 16 and transferred to memory 14 for execution by processor 12, or stored continually in memory 14. The processor 12, memory 14 and storage 16 may comprise any suitable components of a computer system, as is known to those of skill in the art, and operated by any suitable operating system, also as is known to those of skill in the art, for example, the IBM® AIX operating system. The computer system 10 may or may not comprise many additional components.

Another host computer system 20 is also illustrated, and may also comprise at least one processor 22 and an associated memory 24. Programs to be executed and data may be stored in storage 26 and transferred to memory 24 for execution by processor 22, or stored continually in memory 24. The processor 22, memory 24 and storage 26 may also comprise any suitable components of a computer system, as is known to those of skill in the art, and operated by any suitable operating system, also as is known to those of skill in the art, for example, the IBM® z/OS operating system. The host computer system 20 may comprise one of many host computer systems coupled to or connectable to host computer system 10, for example, via a network 27. The host computer system 20 may be located remotely from host computer system 10. The computer system 20 may also comprise many additional components.

Users may provide commands or indicate what programs are to be run by the host computer system 10, for example, via an input 30.

As discussed above, there are several examples of computer program utilities that could be provided at host computer system 10 configured to execute commands on another host computer system, such as computer system 20. Examples of such "shell" programs are "rexec" (remote execution), "rsh" (remote shell), or "ssh" (secure shell). Typically, a command is provided by a user 30 to the shell utility at one host computer system 10 together with the name of another host computer system, such as host computer system 20, to be executed on another host computer system.

It is desirable to know whether or not the command executed successfully on the host computer system 20, and if not, to know whether the command executed on host computer system 20 completed with an error or if the shell utility on host computer system 10 had an error. The determination of successful completion or failure is termed "exit status", as is known to those of skill in the art.

As with any command, if the command is properly executed and completed, a return code may be provided, typically a "0", to indicate successful completion. The return code is provided by the computer system 20 as directed by the shell utility and the command.

In the case of an error where the command does not successfully complete, the return code will be non-zero, and typically is a code that is specified by the command to indicate to the user the type of error. The utility may have an error, such as being unable to connect to the host computer system 20, and the command may not have a chance to execute. To attempt to separate an error with the utility from an error with the command, the utility may have a return code number that is a set value that is different from as many of the command codes as is known by the programmer(s) that created the utility. However, ambiguity occurs if the set value is among the possible exit status values of the remote command.

Shell utilities may forward any number of different types of commands, each of which may have various return codes for various types of errors.

For example, a remote command may comprise "remCmd-p password user@host somecommand"; where "remCmd" is a utility that executes "somecommand" on the remote host "user@host", and "-p password" is a password, and that all comprise parameters of the "remCmd" command. If the "somecommand" successfully completes, "remCmd" exits with the successful completion return code from "somecommand", typically "0". If "somecommand" completes with a non-zero return code, the "somecommand" error return code will be supplied, for example "255". If the "remCmd" fails, such that "somecommand" was not executed or the result of "somecommand" is unknown, it may exit with a return code indicating the shell utility had an error. If the return code for shell utility error is also "255", there will be an ambiguity as to what happened.

In accordance with the present invention, the shell utility is modified to selectively alter at least one pre-existing return code for use on shell utility error to a return code provided as a parameter of the shell utility; and further modified to, in the absence of the provided return code, select the pre-existing return code as a default.

Thus, a user at input 30 that knows that "255" is a possible exit status return code of "somecommand" and that "99" is not, specifies, via a parameter of the shell utility and provided with the command to be executed, to use the return code "99" for shell utility errors. The modified shell utility selectively alters the pre-existing return of the shell utility to the specified parameter of "99".

For example, the shell utility remote command may comprise "remCmd -e 99-p password user@host somecommand", where "-e 99" is an error parameter, and "-p password" is a password. In accordance with the present invention, if "remCmd" has an error it would exit with the altered return code of "99", otherwise it exits with the exit status of "somecommand".

Still in accordance with the present invention, if the user specifies no new exit status return code, the shell utility provides a pre-existing return code if the shell utility has an error.

Figure 2:
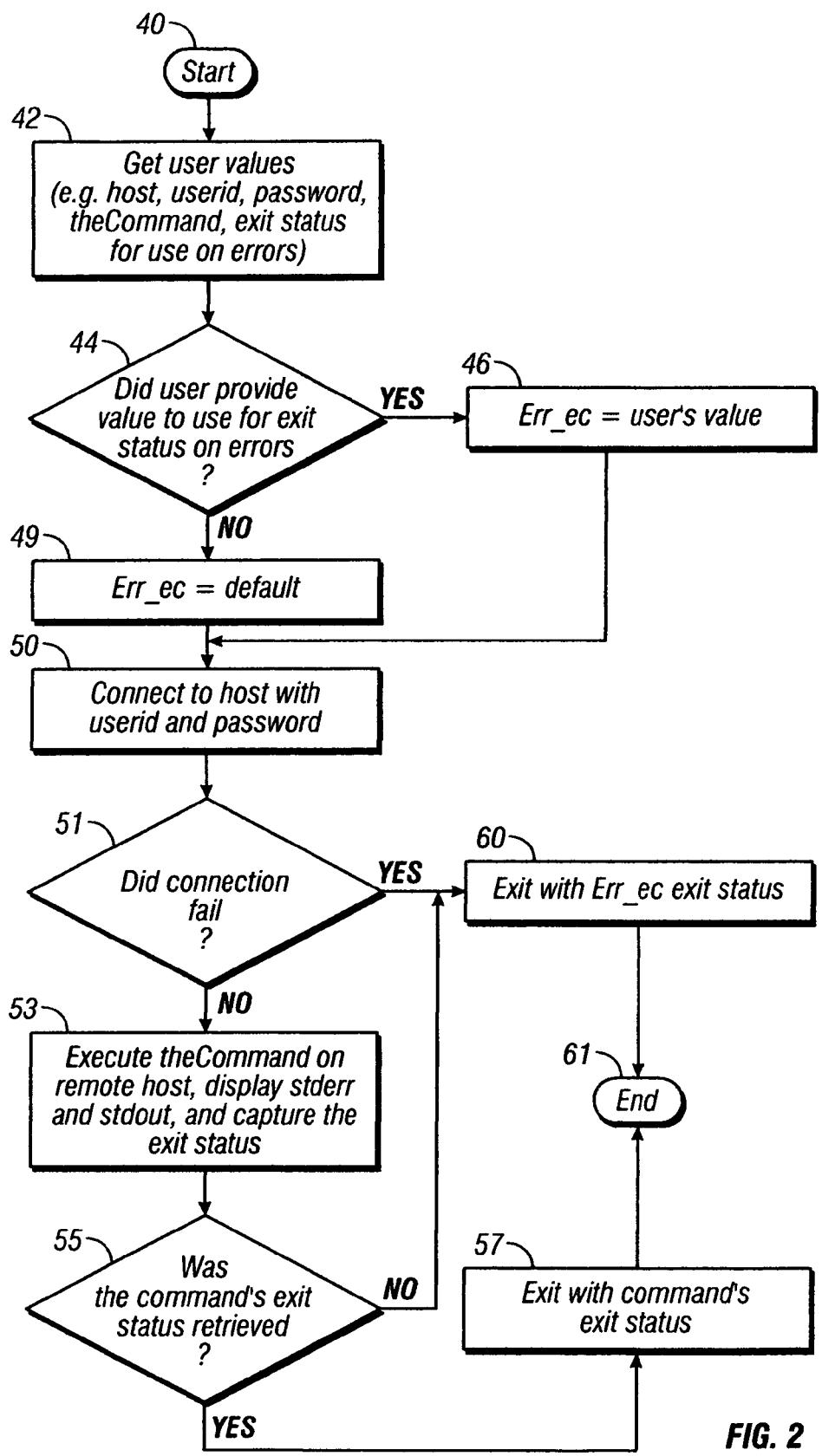
FIG. 2 is a flow chart depicting operations of the shell utility of FIG. 1.

An example of the method of the present invention to be executed by host computer system 10 of FIG. 1 is illustrated in FIG. 2, which begins at step 40. In step 42, the shell utility gets the user values, such as the host that the command is to be executed by, the user id for the other host, the password, the command, and the exit return code for use on errors, if any.

In step 44, the shell utility determines whether the user provided a value to use for exit status on errors. If so, for example, the parameter may comprise "-e 99", discussed above, the shell utility, in step 46, alters the pre-existing return code to the value of "99". If no user value has been provided, the shell utility, in step 49, selects a pre-existing return code of the shell utility as a default. For example, the pre-existing return code may comprise "254".

Step 46 may comprise a direct substitution of the provided return code for the pre-existing return code. Thus, the value of the return code provided by the user is directly substituted for the pre-existing return code. For example, return code "99" is directly substituted for the pre-existing return code "254". Further, the values of a plurality of return codes may be provided in a sequence by the user and directly substituted for pre-existing return codes in the order the user return codes were received. For example, return codes "99", "101" and "102" may be supplied in order and directly substituted for return codes "253", "254" and "255".

Alternatively, the user may reference a table, for example, in memory 14 of FIG. 1, and the selectively altering step 46 of FIG. 2 comprises accessing the referenced table and deriving the provided return code(s) from the table. For example, the user may provide a reference "-t A", and step 46 accesses table "A" and derives the error return codes from the table.

In step 50, the shell utility attempts to connect to the other host 20 in FIG. 1 with the provided user id and password. In step 51 of FIG. 2, the shell utility determines whether the connection failed, and, if the connection is instead successful, "NO", the command is executed on the remote host in step 53. Typically, the results of the command execution will be transmitted back to the shell utility by the host using responses such as "stdout" (standard output) or "stderr" (standard error). The shell utility captures the exit status return code.

In step 55, the shell utility determines whether the command's exit status was retrieved in step 53. If so, "YES", in step 57, the shell utility exits with the command's exit status return code. For example, if the command executed successfully, the return code may be "0", and if the command did not execute successfully, the return code may be a code that describes the type of error, such as "255".

If, however, step 51 indicated that the connection to the other host failed, "YES", or step 57 indicated that the command's exit status return code was not retrieved, "NO", the shell utility, in step 60, now exits with the error return code provided by the user in step 42 and used for the alteration in step 46, or with the pre-existing error return code used as the default in step 48. The shell utility is thus completed, except for possible error recovery, in step 61.

Those of skill in the art will understand that changes may be made with respect to the ordering and specific content of the flow chart of FIG. 2. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. In a shell utility configured to execute at least one command provided to one host computer system on a second host computer system, the computer implemented method of:
    determining whether a value is provided to use for exit status on errors;
    if so, altering at least one pre-existing return code for use on shell utility error; and
    in the absence of an alteration to said at least one pre-existing return code, selecting a pre-existing return code of said shell utility as a default for said use on shell utility error.

2. The method of claim 1, wherein said altering step comprises altering said at least one pre-existing return code for use on shell utility error to a return code provided to said one host computer system as a parameter of said shell utility.

3. The method of claim 2, wherein said parameter is provided with said at least one command to be executed.

4. The method of claim 1, wherein said altering step comprises a direct substitution of said provided return code for said pre-existing return code.

5. The method of claim 1, wherein said altering step comprises accessing a table and deriving said provided return code from said table.

6. A computer implemented method comprising the steps of:
    modifying a shell utility, said shell utility configured to execute at least one command provided to one host computer system on a second host computer system, upon provision of a value to use for exit status on errors, to alter at least one pre-existing return code for use on shell utility error to a return code provided as a parameter of said shell utility; and
    modifying said shell utility to, in the absence of said provided return code, select said pre-existing return code as a default.

7. A computer readable medium configured to store computer program code, said computer program code configured to be usable with at least one computer processor, said computer program code comprising the executable steps of:
    determining whether a value is provided to use for exit status on errors;
    if so, altering at least one pre-existing return code for use on shell utility error, said shell utility configured to execute at least one command provided to one host computer system on a second host computer system; and
    in the absence of an alteration to said at least one pre-existing return code, selecting a pre-existing return code of said shell utility as a default for said use on shell utility error.

8. The computer readable medium of claim 7, wherein said altering step comprises altering said at least one pre-existing return code for use on shell utility error to a return code provided to said one host computer system as a parameter of said shell utility.

9. The computer readable medium of claim 8, wherein said parameter is provided with said at least one command to be executed.

10. The computer readable medium of claim 7, wherein said altering step comprises a direct substitution of said provided return code for said pre-existing return code.

11. The computer readable medium of claim 7, wherein said altering step comprises accessing a table and deriving said provided return code from said table.

12. A computer readable medium configured to store computer program code, said computer program code configured to be usable with at least one computer processor, comprising:
    shell utility computer program code configured to cause said at least one computer processor comprising one host computer system to connect to a second host computer system;
    shell utility computer program code configured to cause said second host computer system to execute at least one command provided to said one host computer system;
    computer program code configured to cause said one host computer system, upon provision of a value to use for exit status on errors, to alter at least one pre-existing return code for use on shell utility error; and
    computer program code configured to cause said one host computer system to, in the absence of an alteration to said at least one pre-existing return code, select a pre-existing return code of said shell utility as a default.

13. The computer readable medium of claim 12, wherein said computer program code configured to cause said one host computer system to alter said at least one return code comprises causing said one host computer system to alter said at least one pre-existing return code for use on shell utility to a return code provided to said one host computer system as a parameter of said shell utility.

14. The computer readable medium of claim 13, wherein said computer program code configured to cause said one host computer system to receive said parameter as provided with said at least one command to be executed.

15. The computer readable medium of claim 12, wherein said computer program code configured to cause said one host computer system to alter said at least one return code comprises causing said one host computer system to directly substitute said provided return code for said pre-existing return code.

16. The computer readable medium of claim 12, wherein said computer program code configured to cause said one host computer system to alter said at least one return code comprises causing said one host computer system to access a table and derive said provided return code from said table.

* * * * *